(12) United States Patent
Gaal et al.

(10) Patent No.: US 9,713,026 B2
(45) Date of Patent: Jul. 18, 2017

(54) CHANNEL STATE INFORMATION (CSI) MEASUREMENT AND REPORTING FOR ENHANCED INTERFERENCE MANAGEMENT FOR TRAFFIC ADAPTATION (EIMTA) IN LTE

(71) Applicant: QUALCOMM Incorporated, San Diego, CA (US)

(72) Inventors: Peter Gaal, San Diego, CA (US); Wanshi Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 138 days.

(21) Appl. No.: 14/275,942

(22) Filed: May 13, 2014

(65) Prior Publication Data

US 2014/0341051 A1    Nov. 20, 2014

Related U.S. Application Data

(60) Provisional application No. 61/824,533, filed on May 17, 2013.

(51) Int. Cl.
*H04B 1/50* (2006.01)
*H04W 24/10* (2009.01)
(Continued)

(52) U.S. Cl.
CPC .......... *H04W 24/10* (2013.01); *H04B 7/0626* (2013.01); *H04B 7/2656* (2013.01);
(Continued)

(58) Field of Classification Search
USPC .................................. 370/252, 277–280, 329
See application file for complete search history.

(56) References Cited

U.S. PATENT DOCUMENTS

2008/0013500 A1* 1/2008 Laroia et al. ................. 370/338
2010/0027456 A1* 2/2010 Onggosanusi ......... H04B 7/024
370/312
(Continued)

FOREIGN PATENT DOCUMENTS

WO    WO-2012167431 A1    12/2012
WO    WO-2013166713 A1    11/2013

OTHER PUBLICATIONS

Huawei et al.; "CSI enhancements for TDD eIMTA;" 3GPP Draft; R1-132407, 3rd Generation Partnership Project (3GPP), Mobile Competence Centre; vol. RAN WG1, Fukuoka, Japan; 20130520-20130524 (May 11, 2013); URL: http:www.3gpp.org/ftp/tsg_ran/WG1_RL1/TSGR1_73/Docs/.*

(Continued)

*Primary Examiner* — Edan Orgad
*Assistant Examiner* — Sithu Ko
(74) *Attorney, Agent, or Firm* — Patterson & Sheridan, L.L.P.

(57) ABSTRACT

Certain aspects of the disclosure generally relate to wireless communications and, more particularly, to techniques for channel state information (CSI) measurement and reporting for enhanced interference management for traffic adaptation (eIMTA) in long term evolution (LTE). According to certain aspects, a method for wireless communications by a user equipment (UE) is provided. The method generally includes identifying, within a set of subframes, one or more flexible subframes that may be dynamically managed for either uplink or downlink communications, determining whether a current flexible subframe is for either uplink or downlink communications, and performing at least one of channel measurement, interference measurement, or channel state reporting based on the determination.

24 Claims, 11 Drawing Sheets

(51) Int. Cl.

| | |
|---|---|
| *H04B 7/06* | (2006.01) |
| *H04B 7/26* | (2006.01) |
| *H04L 1/00* | (2006.01) |
| *H04L 5/00* | (2006.01) |
| *H04L 5/14* | (2006.01) |
| *H04W 72/04* | (2009.01) |
| *H04W 72/08* | (2009.01) |

(52) U.S. Cl.
CPC ............ *H04L 1/0026* (2013.01); *H04L 5/005* (2013.01); *H04L 5/1469* (2013.01); *H04W 72/0446* (2013.01); *H04W 72/085* (2013.01)

(56) References Cited

U.S. PATENT DOCUMENTS

| | | | | |
|---|---|---|---|---|
| 2010/0061345 | A1* | 3/2010 | Wengerter et al. | 370/335 |
| 2011/0176461 | A1* | 7/2011 | Astely et al. | 370/280 |
| 2011/0255431 | A1* | 10/2011 | Wang et al. | 370/252 |
| 2012/0093012 | A1* | 4/2012 | Pedersen | H04B 7/0626 370/252 |
| 2013/0039233 | A1* | 2/2013 | Dai et al. | 370/280 |
| 2013/0083766 | A1* | 4/2013 | Chung et al. | 370/329 |
| 2013/0272170 | A1* | 10/2013 | Chatterjee et al. | 370/280 |
| 2013/0273878 | A1* | 10/2013 | Heo et al. | 455/405 |
| 2013/0336280 | A1* | 12/2013 | Nordstrom et al. | 370/330 |
| 2014/0029486 | A1* | 1/2014 | Li | H04L 5/1469 370/280 |
| 2014/0126402 | A1* | 5/2014 | Nam et al. | 370/252 |
| 2014/0160967 | A1* | 6/2014 | Gao | H04W 24/10 370/252 |
| 2014/0198733 | A1* | 7/2014 | Yin et al. | 370/329 |
| 2014/0204807 | A1* | 7/2014 | Li | H04L 1/1671 370/277 |
| 2014/0204869 | A1* | 7/2014 | Lin | 370/329 |
| 2014/0211753 | A1* | 7/2014 | Choi et al. | 370/330 |
| 2014/0301255 | A1* | 10/2014 | Yin et al. | 370/280 |
| 2015/0055521 | A1* | 2/2015 | Seo et al. | 370/280 |
| 2015/0055584 | A1* | 2/2015 | Lee et al. | 370/329 |
| 2015/0109973 | A1* | 4/2015 | Yao et al. | 370/280 |
| 2015/0117294 | A1* | 4/2015 | Li et al. | 370/312 |

OTHER PUBLICATIONS

Huawei: "CSI enhancements for TDD eIMTA," 3GPP Draft; R1-132407, 3rd Generation Partnership Project (3GPP), Mobile Competence Centre; 650, Route Des Lucioles; F-06921 Sophia-Antipolis Cedex; France, vol. RAN WG1, No. Fukuoka, Japan; 20130520-20130524, May 11, 2013 (May 11, 2013), XP050698171, Retrieved from the Internet < URL: http://www.3gpp.org/ftp/tsg_ran/WG1_RL1/TSGR1_73/Docs/ >, [retrieved on May 11, 2013], paragraph [0002].

International Search Report and Written Opinion—PCT/US2014/037988—ISA/EPO—Oct. 29, 2014.

Nokia Siemens Networks et al: "On CSI measurements for eIMTA," 3GPP Draft; R1-132296, 3RD Generation Partnership Project (3GPP), Mobile Competence Centre; 650, Route Des Lucioles; F-06921 Sophia-Antipolis Cedex; France, vol. RAN WG1, No. Fukuoka, Japan; 20130520-20130524, May 11, 2013 (May 11, 2013), XP050698062, Retrieved from the Internet < URL: http://www.3gpp.org/ftp/tsg_ran/WG1_RL1/TSGR1_73/Docs/ >, [retrieved on May 11, 2013], paragraph [002.].

Nokia Siemens Networks et al: "On Signalling Mechanisms to Support Dynamic TDD UL-DL reconfiguration," 3GPP Draft; R1-132297, 3rd Generation Partnership Project (3GPP), Mobile Competence Centre; 650, Route Des Lucioles; F-06921 Sophia-Antipolis Cedex; France, vol. RAN WG1, No. Fukuoka, Japan; 2013-0520-20130524, May 11, 2013 (May 11, 2013), XP050698063, Retrieved from the Internet < URL: http://www.3gpp.org/ftp/tsg_ran/WG1_RL1/TSGR1_73/Docs/ >, [retrieved on May 11, 2013], paragraphs [02.1], [02.2].

Qualcomm Incorporated: "Remaining details of CSI measurement and reporting in eIMTA," 3GPP Draft; R1-140438, 3rd Generation Partnership Project (3GPP), Mobile Competence Centre; 650, Route Des Lucioles, F-06921 Sophia-Antipolis Cedex; France, vol. RAN WG1, No. Prague, Czech Republic; 20140210-20140214, Feb. 1, 2014 (Feb. 1, 2014), XP050752038, Retrieved from the Internet < URL: http://www.3gpp.org/ftp/tsg_ran/WG1_RL1/TSGR1_76/Docs/ >, [retrieved on Feb. 1, 2014], paragraphs [001.], [2.2.1], [02.3].

Samsung: "CRS presence in flexible subframes," 3GPP Draft; R1-131967, 3rd Generation Partnership Project (3GPP), Mobile Competence Centre; 650, Route Des Lucioles; F-06921 Sophia-Antipolis Cedex; France, vol. RAN WG1, No. Fukuoka, Japan; 20130520-20130524, May 11, 2013 (May 11, 2013), XP050697751, Retrieved from the Internet < URL: http://www.3gpp.org/ftp/tsg_ran/WG1_RL1/TSGR1_73/Docs/ >, [retrieved on May 11, 2013], paragraphs [02.1], [02.2].

ZTE: Remaining details of Signalling for TDD UL-DL Reconfiguration Details of Signalling for TDD UL-DL Reconfiguration, 3rd Generation Partnership Project (3GPP), Mobile Competence Centre; 650, Route Des Lucioles; F-06921 Sophia-Antip, vol. RAN WG1, No. San Francisco, USA, 20131111-20131115, Nov. 13, 2013 (Nov. 13, 2013), XP050735047, Retrieved from the Internet < URL: http://www.3gpp.org/ftp/Meetings_3GPP_SYNC/RAN/RAN1/Docs/ >, [retrieved on Nov. 13, 2013] paragraph [001.]—paragraph [003.].

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 6

CHANNEL STATE INFORMATION (CSI) MEASUREMENT AND REPORTING FOR ENHANCED INTERFERENCE MANAGEMENT FOR TRAFFIC ADAPTATION (EIMTA) IN LTE

CLAIM OF PRIORITY UNDER 35 U.S.C. §119

This application claims benefit of U.S. Provisional Patent Application Ser. No. 61/824,533, filed May 17, 2013, which is herein incorporated by reference in its entirety.

BACKGROUND

I. Field

Certain aspects of the disclosure generally relate to wireless communications and, more particularly, to techniques for channel state information (CSI) measurement and reporting for enhanced interference management for traffic adaptation (eIMTA) in long term evolution (LTE).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Techniques and apparatus are provided herein for channel state information (CSI) measurement and reporting for enhanced interference management for traffic adaptation (eIMTA) in long term evolution (LTE).

Certain aspects of the present disclosure provide a method of wireless communications by a user equipment (UE). The method generally includes identifying, within a set of subframes, one or more flexible subframes that may be dynamically managed for either uplink or downlink communications, determining whether a current flexible subframe is for either uplink or downlink communications, and performing at least one of channel measurement, interference measurement, or channel state reporting based on the determination.

Certain aspects of the present disclosure provide a method of wireless communications by a base station. The method generally includes identifying, within a set of subframes, one or more flexible subframes that may be dynamically managed for either uplink or downlink communications, determining whether a current flexible subframe is for either uplink or downlink communications, receiving channel state information (CSI) feedback from a user equipment (UE), and processing the CSI feedback based on the determination.

Certain aspects of the present disclosure provide a method of wireless communications by a user equipment (UE). The method generally includes identifying, within a set of subframes, one or more flexible subframes that may be dynamically managed for either uplink or downlink communications, determining whether a current subframe is a fixed subframe or a flexible subframe, and performing downlink channel measurements based on the determination.

Certain aspects of the present disclosure provide an apparatus for wireless communications by a user equipment (UE). The apparatus generally includes at least one processor configured to identify, within a set of subframes, one or more flexible subframes that may be dynamically managed for either uplink or downlink communications, determine whether a current flexible subframe is for either uplink or downlink communications, and perform at least one of channel measurement, interference measurement, or channel state reporting based on the determination. The apparatus generally also includes a memory coupled with the at least one processor.

Certain aspects of the present disclosure provide an apparatus for wireless communications by a base station. The apparatus generally includes at least one processor configured to identify, within a set of subframes, one or more flexible subframes that may be dynamically managed for either uplink or downlink communications, determine whether a current flexible subframe is for either uplink or downlink communications, receive channel state information (CSI) feedback from a user equipment (UE), and process the CSI feedback based on the determination. The apparatus generally also includes a memory coupled with the at least one processor.

Certain aspects of the present disclosure provide an apparatus for wireless communications by a user equipment (UE). The apparatus generally includes at least one processor configured to identify, within a set of subframes, one or more flexible subframes that may be dynamically managed for either uplink or downlink communications, determine whether a current subframe is a fixed subframe or a flexible subframe, and perform downlink channel measurements based on the determination. The apparatus generally also includes a memory coupled with the at least one processor.

Certain aspects of the present disclosure provide an apparatus for wireless communications by a user equipment (UE). The apparatus generally includes means for identifying, within a set of subframes, one or more flexible subframes that may be dynamically managed for either uplink or downlink communications, means for determining whether a current flexible subframe is for either uplink or downlink communications, and means for performing at least one of channel measurement, interference measurement, or channel state reporting based on the determination.

Certain aspects of the present disclosure provide an apparatus for wireless communications by a user equipment (UE). The apparatus generally includes means for identifying, within a set of subframes, one or more flexible subframes that may be dynamically managed for either uplink or downlink communications, means for determining whether a current subframe is a fixed subframe or a flexible subframe, and means for performing downlink channel measurements based on the determination.

Certain aspects of the present disclosure provide a computer program product for wireless communications by a user equipment (UE). The computer program product generally includes a computer-readable medium comprising code for identifying, within a set of subframes, one or more flexible subframes that may be dynamically managed for either uplink or downlink communications, determining whether a current flexible subframe is for either uplink or downlink communications, and performing at least one of channel measurement, interference measurement, or channel state reporting based on the determination.

Certain aspects of the present disclosure provide a computer program product for wireless communications by a user equipment (UE). The computer program product generally includes a computer-readable medium comprising code for identifying, within a set of subframes, one or more flexible subframes that may be dynamically managed for either uplink or downlink communications, determining whether a current subframe is a fixed subframe or a flexible subframe, and performing downlink channel measurements based on the determination.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates example downlink (DL) and UL subframe configurations, in accordance with certain aspects of the present disclosure.

DETAILED DESCRIPTION

Techniques and apparatus are provided herein for channel state information (CSI) measurement and reporting for enhanced interference management for traffic adaptation (eIMTA) in long term evolution (LTE). According to certain aspects, a user equipment (UE) may identify subframes as fixed or flexible subframes. The UE may also determine, for example, via received signaling or blind detection, whether the subframes are dedicated for uplink or downlink transmissions. If a flexible subframe is determined as an uplink subframe the UE may skip interference measurement and/or CSI measurement filtering for that subframe. Alternatively, the UE may perform interference measurement using fraction of or full system bandwidth. The UE may also omit CSI reporting for that subframe. Alternatively, the UE may report as usual or report a predetermined value. According to certain aspects, the UE may specify a new CSI reference signal (CSI-RS) and interference measurement resource (IMR) configuration in the last symbol of the subframe which may be used for downlink channel measurements. The UE may also designate all flexible subframes as invalid subframes for downlink measurements.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3 GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Communications Network

Figure 1:
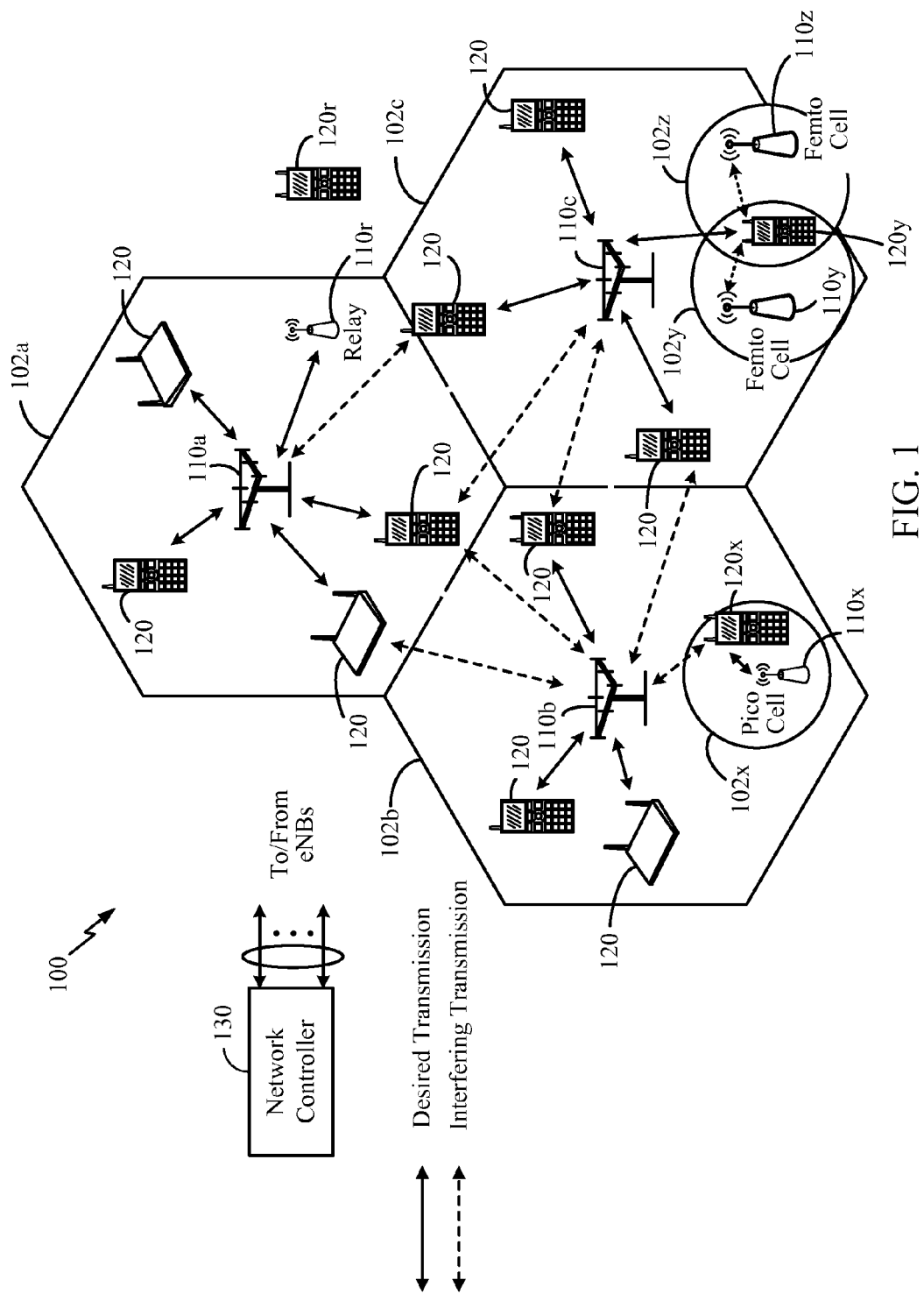
FIG. 1 is a block diagram conceptually illustrating an example of a wireless communications network, in accordance with certain aspects of the present disclosure.

FIG. 1 shows a wireless communication network 100, which may be a long term evolution (LTE) network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE (e.g. UE relay station) that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 (e.g., 120x, 120y) may be dispersed throughout the wireless network 100, and each UE may be stationary or mobile. A UE may also be referred to as a terminal, a mobile station, a subscriber unit, a station, etc. A UE may be a cellular phone, a smart phone, a personal digital assistant (PDA), a wireless modem, a wireless communication device, a handheld device, a laptop/notebook computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
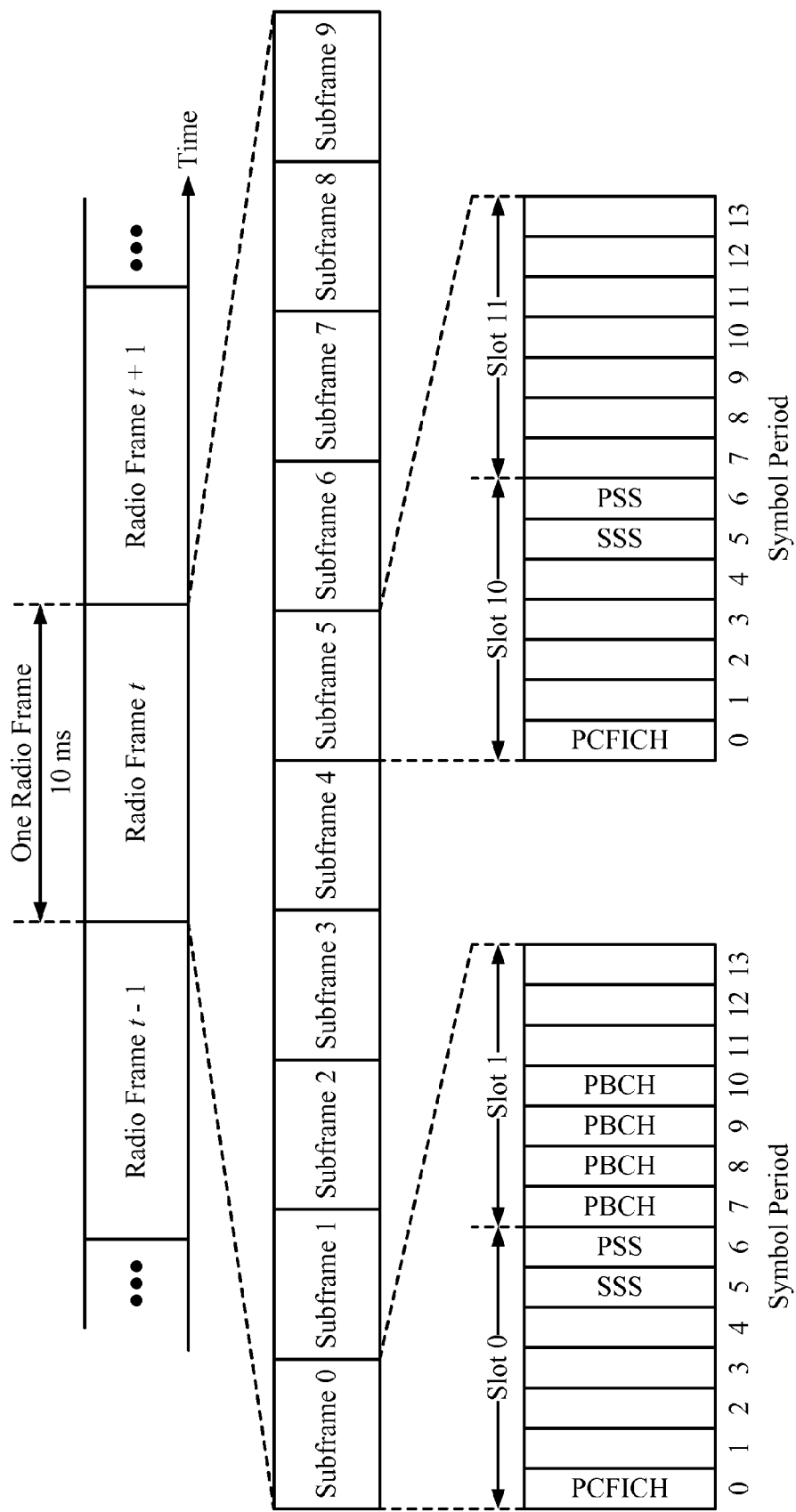
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
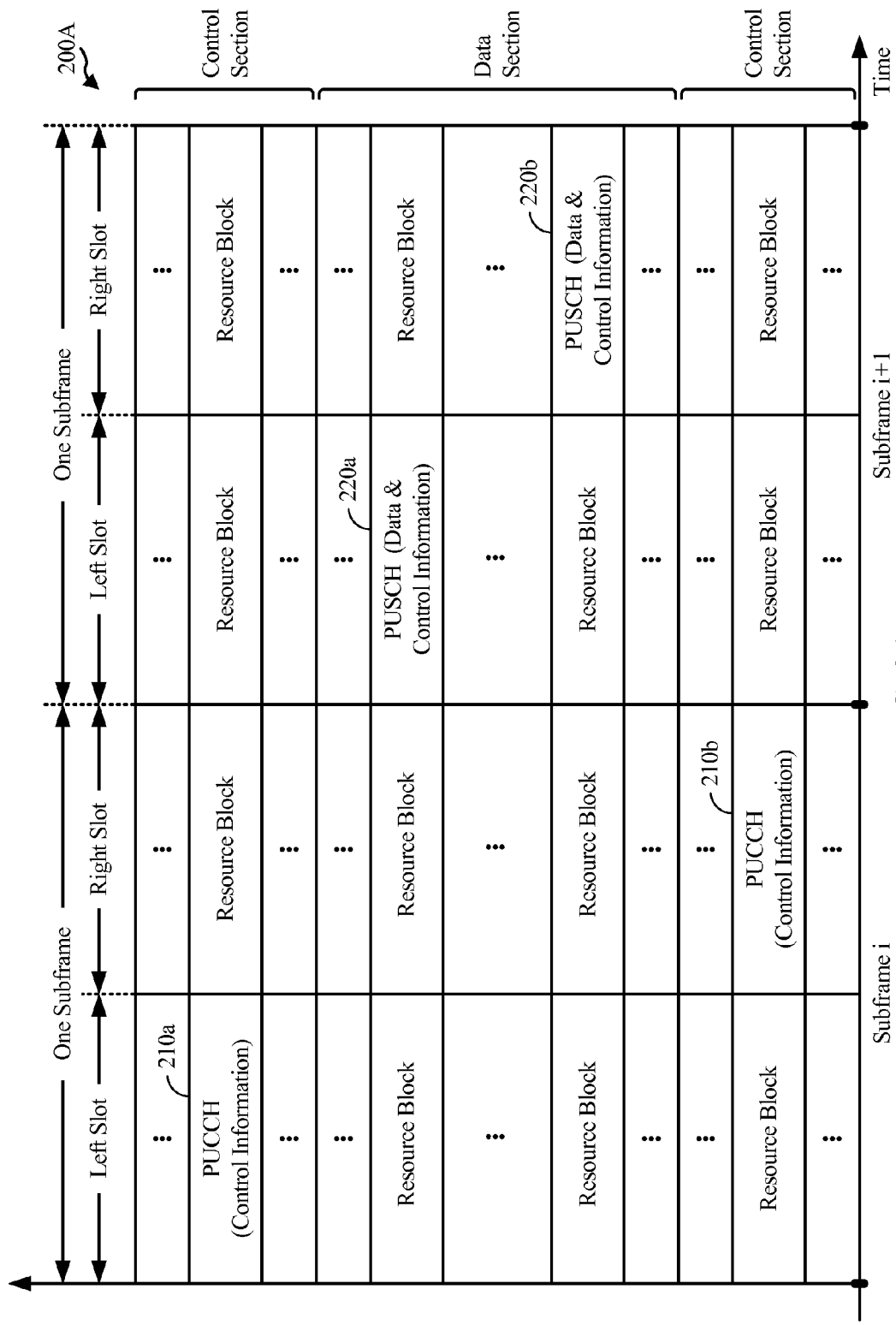
FIG. 2A shows an example format for the uplink (UL) in long term evolution (LTE), in accordance with certain aspects of the present disclosure.

FIG. 2A shows an exemplary format 200A for the uplink in LTE. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

According to certain aspects, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
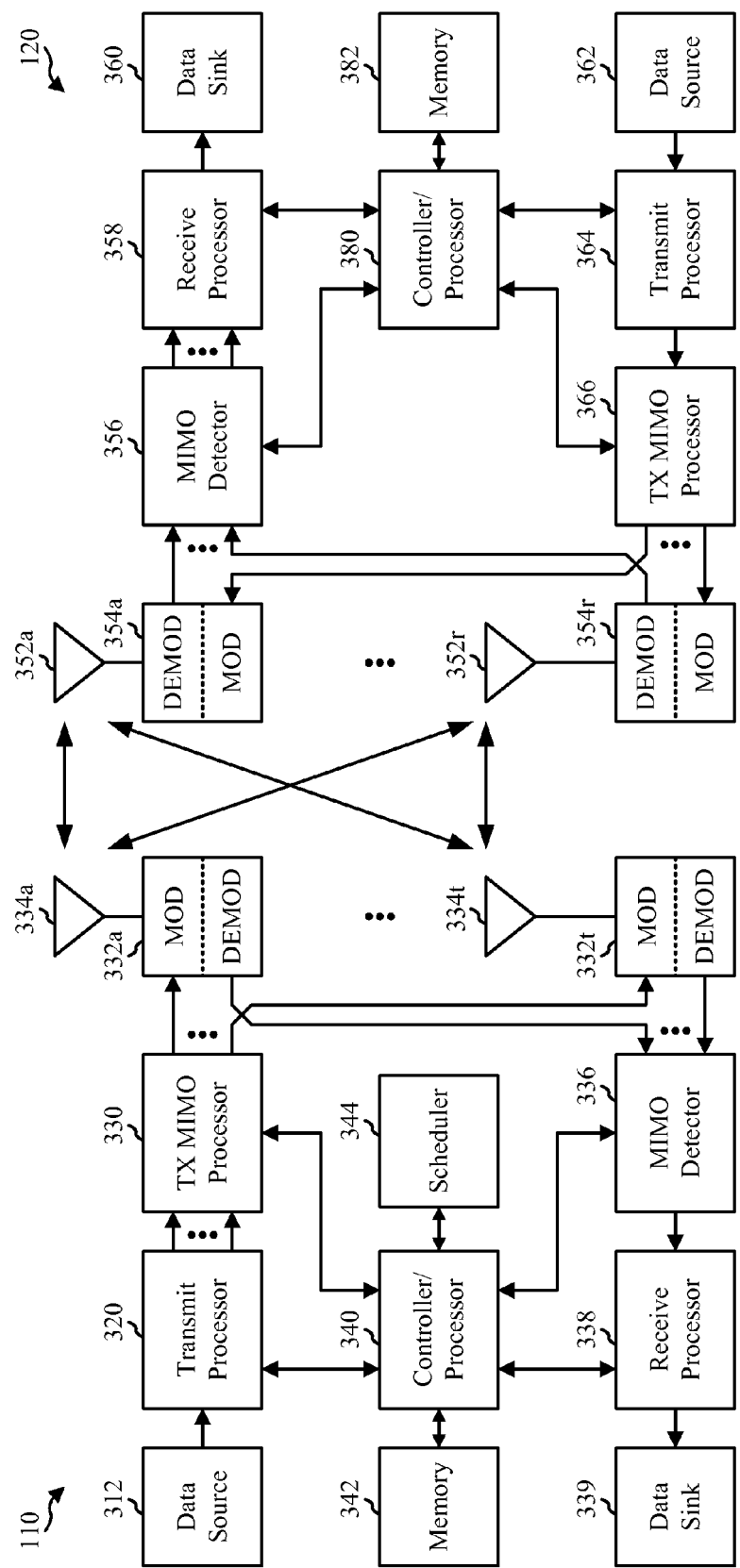
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station (BS) or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIG. 8 and/or other processes for the techniques described herein. The memories 342 and 382 may store data and program codes for the eNB 110 and the UE 120, respectively. A scheduler 344 may schedule UEs for data transmission on the downlink and/or uplink. eNB 110 may transmit static resource partitioning information (SPRI) 390 to UE 120. UE 120 may transmit sounding reference signals (SRS) 392 to eNB 110.

Example Resource Allocation for Enhanced Physical Downlink Control Channel (EPDCCH)

In existing wireless communications systems (e.g., so called "legacy" LTE Rel-8/9/10 systems), physical downlink control channel (PDCCH) is located in the first several symbols of a long term evolution (LTE) subframe. The PDCCH is generally distributed across the entire bandwidth of the subframe and is time division multiplexed (TDM) with physical downlink shared channel (PDSCH). In other words, the subframe is effectively divided into a control region and a data region, and the PDCCH occupies the first several symbols of the control region.

An enhanced PDCCH (EPDCCH) may be defined, for example, in "non-legacy" systems (e.g., LTE Rel-11/12 or later) which may complement or replace the legacy PDCCH (e.g., with "legacy" referring to LTE Rel-10 or earlier). Unlike the legacy PDCCH which occupies the control region of the subframe in which it is transmitted, the EPDCCH generally occupies the data region of the subframe, similar to the legacy PDSCH. In other words, an EPDCCH region may be defined that occupies the conventional/legacy PDSCH region. The EPDCCH region may consist of multiple contiguous or non-contiguous resource blocks (RBs) and may occupy a subset of OFDM symbols within those RBs.

The EPDCCH may have several advantages over the legacy PDCCH. For example, the EPDCCH may help increase control channel capacity (e.g., and may add to the capacity of the legacy PDCCH), support frequency-domain inter-Cell interference cancellation (ICIC), achieve improved spatial reuse of control channel resources, support beamforming and/or diversity, operate on New Carrier Type (NCT) and in Multicast-Broadcast Single Frequency Network (MBSFN) subframes, and/or coexist on a same carrier as legacy UEs.

UE-specific demodulation reference signals (DM-RSs) may be used for downlink channel estimation for coherent demodulation of the PDSCH/EPDCCH. To provide good channel estimation for the PDSCH/EPDCCH, each RB carrying the PDSCH/EPDCCH may include sufficient DM-RS for good channel estimation within the RB.

Figure 4:
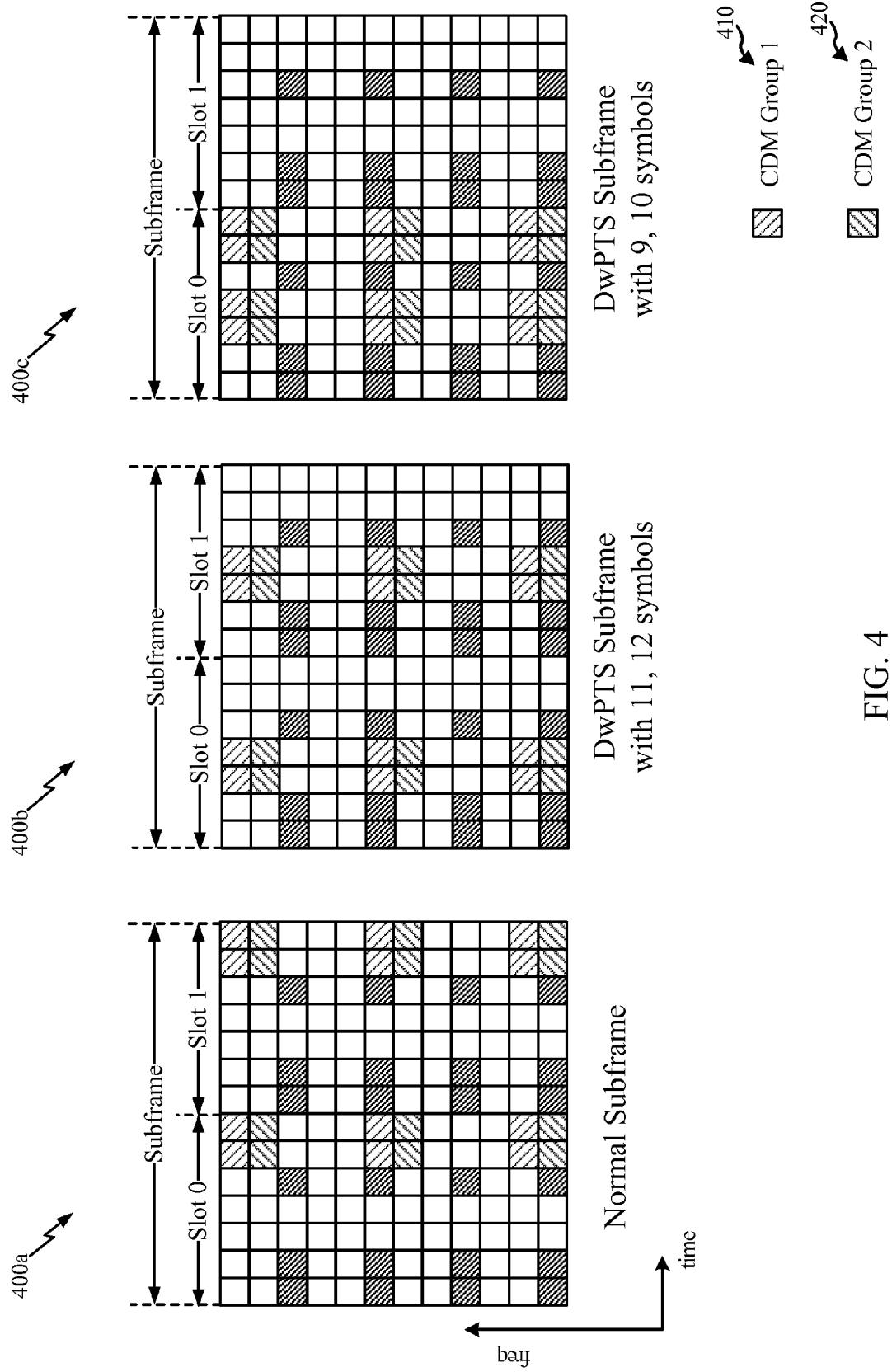
FIG. 4 illustrates demodulated reference signal (DM-RS) patterns, in accordance with certain aspects of the present disclosure.

FIG. 4 illustrates example DM-RS patterns 400a-c, as defined in Rel-10 for the normal cyclic prefix (CP) case. As shown in FIG. 4, resource elements (REs) 410 and 420 are allocated for DM-RS transmissions. In the illustrated example, REs 410 are used for code division multiplexing (CDM) Group 1 and REs 420 are used for CDM Group 2.

DM-RS pattern 400a shows a DM-RS pattern for a normal subframe. As used herein, the term normal subframe is a relative term, referring to a subframe that does not have a Downlink Pilot Time Slot (DwPTS), a special downlink timeslot that typically occurs in certain subframes (e.g., the 2nd or 7th subframe in a radio frame, depending on a subframe configuration) when LTE is operated in Time Division Duplex (TDD). The length of DwPTS subframes is variable, to allow for different DL/UL switching periods to be configured.

DM-RS pattern 400b shows an example D-MRS pattern for a DwPTS subframe with 11 or 12 symbols. As shown in this example, the DM-RS occupies the third and fourth symbols of each of the first and second slots of the subframe. DMRS pattern 400c shows a DM-RS pattern for a DwPTS subframe with 9, 10 symbols. As shown in this example, the DM-RS occupies the third, fourth, sixth and seventh symbols of the, first slot of the subframe.

In legacy systems (e.g., Rel-8/9/10), the Primary Synchronization Signal (PSS) and the Secondary Synchronization Signal (SSS) are generally transmitted in the center six RBs only in subframes 0 and 5 (e.g., as shown in FIG. 2). The Primary Broadcast Channel (PBCH) is also generally transmitted in the center six RBs but only in subframe 0.

Figure 5:
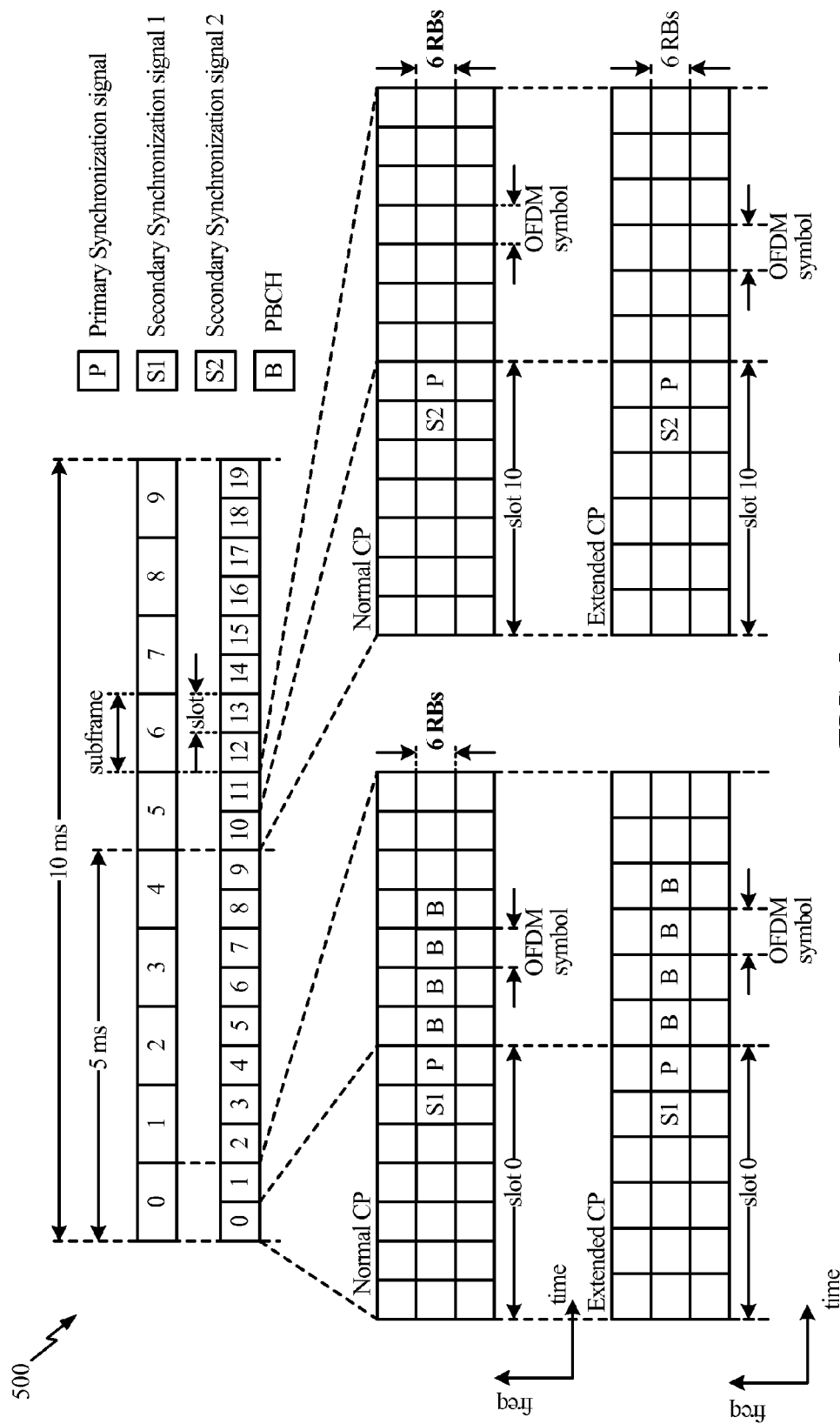
FIG. 5 illustrates resource configuration for primary synchronization signal (PSS), secondary synchronization signal (SSS), and physical broadcast channel (PBCH) in an LTE frame, in accordance with certain aspects of the present disclosure.

FIG. 5 illustrates an example resource configuration 500 for PSS, SSS and PBCH in an LTE frame, in accordance with certain aspects of the present disclosure. As shown in FIG. 5, an LTE frame 10 ms long is typically divided into ten subframes each 1 ms long. Each subframe may further be divided into two slots, slot 0 and slot 1. As shown, PSS and SSS are typically transmitted every 5 ms in subframes 0 and 5. The PSS and SSS are transmitted back to back in the last two symbols of the first slot in the subframes 0 and 5. Typically, SSS is transmitted before PSS. In order to differentiate the 10 ms boundary, the two SSS signals, SSS1 (subframe 0) and SSS2 (subframe 5) may have different arrangements. The PSS arrangement, however, may be fixed. PBCH is transmitted every 10 ms in the first four symbols of the second slot of subframe 0.

The above defined PSS/SSS/PBCH configuration is used for frequency division duplex (FDD) transmission. For TDD transmissions, the SSS may be transmitted in the last symbol of subframes 0 and 5, and the PSS may be transmitted in the third symbol of subframes 1 and 6.

Example CSI Measurement and Reporting for EIMTA in LTE

In certain systems (e.g., LTE), both frequency division duplexing (FDD) and time division duplexing (TDD) frame structures are supported. TDD is a mode of the common LTE standard that is specified for the unpaired spectrum where the transmissions travel in both the downlink and uplink directions on the same frequency band. For TDD, two switching periodicities are supported—5 ms and 10 ms—and seven possible downlink (DL) and uplink (UL) subframe configurations are supported, as illustrated in FIG. 6. As shown in the table 600 illustrated in FIG. 6, UL/DL subframe configurations 0, 1, 2, and 6 have a 5 ms switching periodicity and have two special subframes in one frame (e.g., subframe 1 and subframe 6). As shown in FIG. 6, UL/DL subframe configurations 3, 4, and 5 have a 10 ms switching periodicity and have one special subframe in one frame (e.g., subframe 2).

Figure 7:
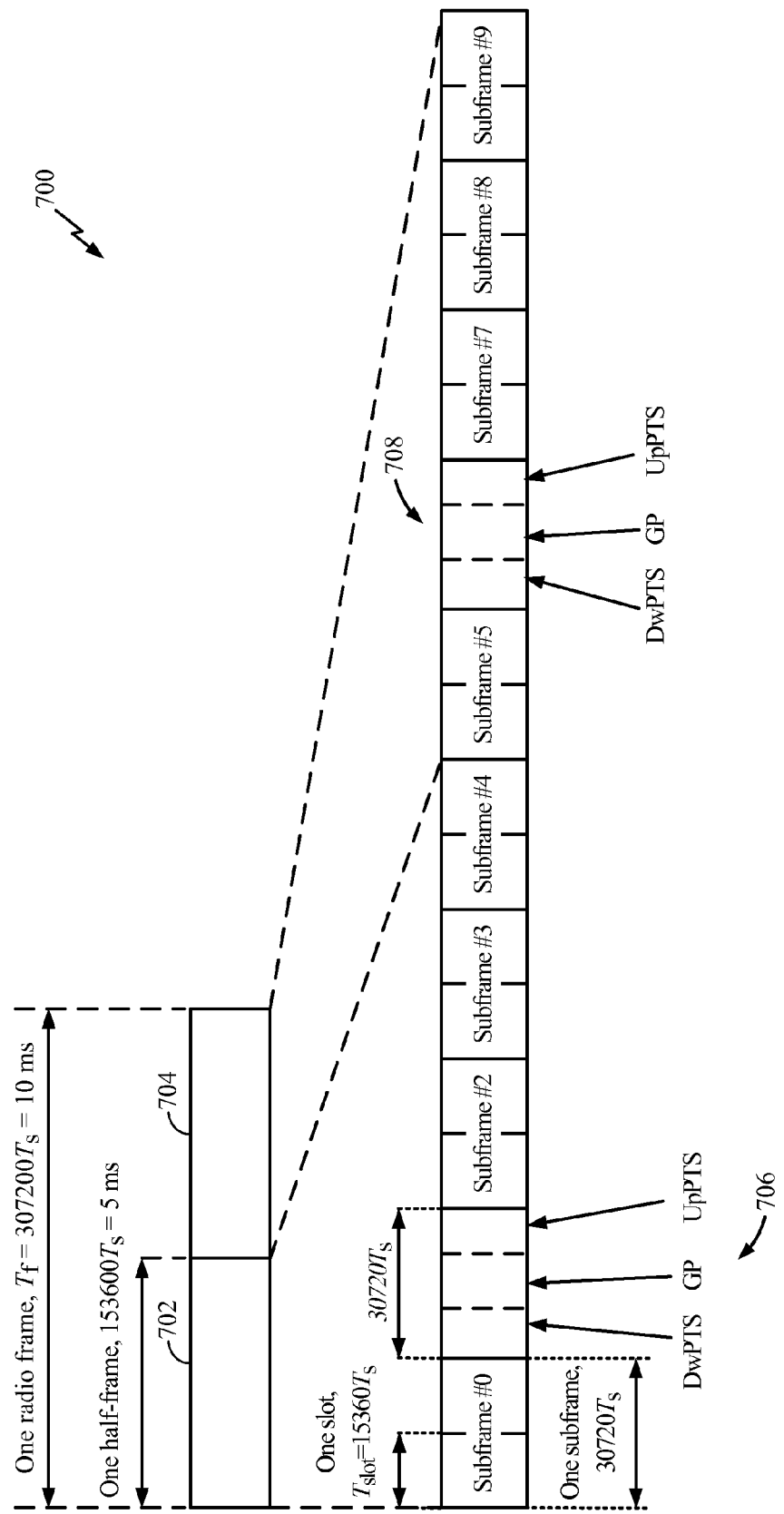
FIG. 7 illustrates an example time division duplexing (TDD) frame structure with 5 ms switching periodicity having two special subframes, in accordance with certain aspects of the present disclosure.

FIG. 7 illustrates an example TDD frame structure 700 with 5 ms switching periodicity having two special subframes 706 and 708, in accordance with certain aspects of the present disclosure. As shown in FIG. 7, the radio frame 700 may be 10 ms and thus, be divided into two 5 ms half-frames 702 and 704. The frame 700 may include ten 1 ms subframes (e.g., subframes 0-9)—thus each half-frame includes five subframes. Each subframes may be divided into two slots. As shown in FIG. 7, subframe 1 and subframe 6 may be special subframes 706 and 708. Each of the special subframes 706 and 708 may include a Downlink Pilot Time Slot (DwPTS), a Guard Period (GP), and an Uplink Pilot Time Slot (UpPTS).

In certain systems (e.g., LTE Rel-12), subframes can be classified as fixed subframes and dynamic subframes. Dynamic subframes whose direction can be dynamically changed (e.g., managed as UL and DL subframes)—rather than having a fixed direction (e.g., as either a DL subframe or an UL subframe). In such systems, it is possible to dynamically adapt TDD DL/UL subframe configurations (e.g., TDD DL/UL subframe configurations shown in FIG. 6) based on the actual traffic needs. This may be referred to as evolved interference management for traffic adaptation (eIMTA). In eIMTA the subframes can be classified as fixed subframes and dynamic subframes. Dynamic subframes can be dynamically managed as UL or DL subframes. In case of UL subframe and where the UE is also configured to monitor the subframe for CSI measurement, there may not be any CRS or CSI-RS for the UE to measure, causing CSI measurement and reporting issues.

As an illustrative example of eIMTA, if during a short duration a large data burst on downlink is desired, the configuration may be changed to a more downlink heavy subframe configuration. For example, referring to FIG. 6, the subframe configuration may be changed from configuration #1 (DSUUDDSUUD) having six DL subframes and 4 UL subframes to subframe configuration #5 (DSUDDDDDDD) having nine downlink subframes and one uplink subframe.

The adaptation of TDD configurations may be no slower than 640 ms. In the extreme case, the adaptation may be as fast as 10 ms. The TDD configuration adaptation, however, may cause overwhelming interference to both downlink and uplink when two or more cells have different downlink and uplink subframes. The adaptation also may cause complexity in DL and UL hybrid automatic repeat request (HARQ) timing management.

Each of the seven DL/UL subframe configurations (again referring to FIG. 6) has its own DL/UL HARQ timing. The DL/UL HARQ timing may be optimized for each configuration in terms of HARQ operation efficiency. For example, the timing from physical downlink shared channel (PDSCH) to the corresponding acknowledgement/negative acknowledgement (ACK/NAK) may be different for different TDD DL/UL subframe configurations. Dynamically switching among the seven TDD DL/UL subframe configurations—or additional configurations if more flexible adaptation is desired—implies that if conventional DL/UL HARQ timing is kept, ACK/NAK transmission opportunities may be missed for some DL or UL transmissions.

As noted above, In eIMTA, subframes may be generally categorized as "fixed" subframes and "flexible" (dynamic) subframes. Fixed subframes are not expected to change in a dynamic or semi-static manner, but only when a cell determines to change the subframe configurations (e.g., from one of the seven TDD UL/DL subframe configurations shown in FIG. 6 to another of the seven TDD UL/DL subframe configurations) in a static manner. The direction of flexible subframes may change in a dynamic manner, for example, due to scheduler decisions based on traffic needs. As another example, the direction of a subframe may change due to inter-cell and/or intra-cell interference considerations.

Different cells may share a common set of fixed subframes such that there is generally no DL-to-UL interference or UL-to-DL interference in the fixed subframes. Flexible subframes, on the other hand, may be subject to interference (e.g., DL-to-UL interference or UL-to-DL interference).

The designation of a fixed subframe, rather than a flexible subframe, may be indicated to a user equipment (UE) via some signaling or it may be predefined (e.g., hard-coded). For example, referring to FIG. 6, a system information block 1 (SIB1) can broadcast TDD UL/DL subframe configuration 0 (DSUUUDSUUU). In this example, subframes 0/1/2/5/6/7 may be fixed subframes, while subframes 3/4/8/9 may be flexible subframes. In some cases, the UE (e.g., a Rel-12 UE) may receive an explicit indication of the set of fixed subframes, for example, via dedicated signaling or broadcast signaling.

In fixed subframes, if the cell is of legacy carrier type (LCT)—or a backwards compatible carrier type—CRS is typically transmitted in all subframes on up to four CRS antenna ports. In cases where the cell is of new carrier type (NCT), CRS may not be transmitted in all subframes and the number of CRS ports may be fixed at one. Previously, LTE-Advanced (LTE-A) standardization has required carriers to be backward-compatible, which enabled a smooth transition to new releases. However, this required the carriers to continuously transmit common reference signals (CRS, also referred to as cell-specific reference signals) in every subframe across the bandwidth. Most cell site energy consumption is caused by the power amplifier, since the cell remains on even when only limited control signalling is being transmitted, causing the amplifier to continue to consume energy. CRS were introduced in release 8 of LTE and are LTE's most basic downlink reference signal. CRS are transmitted in every resource block (RB) in the frequency domain and in every downlink subframe. CRS in a cell can be for one, two, or four corresponding antenna ports. CRS may be used by remote terminals to estimate channels for coherent demodulation. A new carrier type (NCT) allows temporarily switching off of cells by removing transmission of CRS in four out of five subframes. This reduces power consumed by the power amplifier. It also reduces the overhead and interference from CRS, since the CRS will not be continuously transmitted in every subframe across the bandwidth. In addition, the NCT allows the downlink control channels to be operated using UE-specific demodulation reference symbols (DM-RS). The NCT might be operated as a kind of extension carrier along with another LTE/LTE-A carrier or, alternatively, as a standalone non-backward compatible carrier.

For UL subframes, a UE can be configured to monitor the subframes for channel state information (CSI) measurements. However, there may not be any cell-specific reference signals (CRS) or CSI-RS for the UE to measure. In this case, CSI measurement and reporting may be impacted.

An LCT cell may transmit flexible subframes with no CRS (i.e., CRS-less operation). This may allow more efficient DL operations, in that transmission resources that would have been used for transmitting CRS are available to carry data. These flexible subframes in a LCT cell may not have a legacy control region. The flexible subframes in the LCT cell may support only demodulation reference signal (DM-RS) based enhanced physical downlink control channel (EPDCCH) and PDSCH. The PDSCH and EPDCCH can start from symbol 0.

Channel state information reference signals (CSI-RS) may be transmitted in the flexible subframes in the LCT cell to allow CSI feedback corresponding to these flexible subframes. In some cases, it may be possible to operate at least some flexible subframe in the LCT cell with CRS, but with CRS overhead reduction. For example, flexible subframes can be treated as multicast broadcast single frequency network (MBSFN) subframes, such that CRS may be present in the first symbol of the subframes.

A UE (e.g., similar to UE 120 illustrated in FIGS. 1 and 3) may be configured with certain subframes for channel measurement and interference measurement for CSI feedback. Typically, for channel measurement, a UE may be configured in one or more sets of non-zero-power (NZP) CSI-RS configurations. For interference measurement, a UE may be configured in one or more sets of interference measurement resource (IMR) configurations. The IMR configurations may or may not follow zero-power (ZP) configurations.

The UE may be configured with one or more CSI-RS processes. Each CSI-RS process may comprise a NZP CSI-RS configuration and an IMR configuration. This configuration is semi-static. In order to measure interference characteristics in the flexible subframes, one or more IMR configuration may have some subframes belonging to the set of flexible subframes (e.g., the UE may be configured to measure interference on at least some of the flexible subframes).

Some NZP CSI-RS configurations may have some subframes belonging to the set of flexible subframes as well (e.g., the UE may be configured to perform channel measurements on at least some of the flexible subframes). However, unlike interference characteristics, channel conditions may not vary much across subframes, especially for low mobility UEs. Because the conditions are not likely to vary across subframes, it is possible to use channel measurements from a fixed subframe to represent the channel conditions in a flexible subframe if the two subframes do not have a large time gap.

As mentioned above, a flexible subframe may be of downlink direction or uplink direction. If the UE configures an uplink subframe for interference measurement or channel measurement, the measurement would be useless, and if any filtering is performed over subframes, it would impact "good" measurements in other subframes as well. In cases where the UE is configured to monitor a subframe for CSI measurement, there may not be any CRS or CSI-RS for the UE to measure (e.g., due to the subframe being unavailable for downlink transmission, or due to the carrier being NCT, etc.), which may cause CSI measurement and reporting issues.

Aspects of the present disclosure provide techniques for processing subframes based on whether the subframes are uplink direction or downlink direction and whether the subframes are fixed subframes or flexible subframes. Certain aspects provide techniques for CSI measurement and reporting for eIMTA in LTE. According to certain aspects, a UE may identify subframes as fixed or flexible subframes. The UE may also determine, for example, via received signaling or blind detection, whether the subframes are dedicated for uplink or downlink transmissions. Based on the determination of whether a subframe is fixed or flexible and for uplink or for downlink, the UE may process the subframe accordingly.

According to certain aspects, channel and interference measurements may be transmission direction dependent. In aspects, a UE (e.g., similar to UE 120 illustrated in FIGS. 1 and 3) may determine the transmission direction (e.g., whether for uplink or for downlink) of a flexible subframe. The flexible subframe may be configured for the UE to measure interference and/or channel. The UE may perform the measurement or CSI reporting based on the determination of the transmission direction. In aspects, the flexible subframe may not be configured for the UE to perform any measurements. In this case, the UE may still determine the transmission direction, for example, depending on how the UE determines the transmission direction (e.g., by signaling or by blind detection) of the subframe, for the purpose of CSI measurement and/or feedback.

According to certain aspects, the UE may determine the transmission direction of a flexible subframe in various manners. In aspects, the UE may receive an explicit indication of whether the flexible subframe is dedicated for downlink transmissions or uplink transmissions. For example, the UE may be indicated via broadcast signaling or dedicated signaling (e.g., in a downlink control information (DCI)). Explicit signaling may be received in a subframe earlier than the current flexible subframe. For example, explicit signaling may be received in an earlier fixed downlink subframe in order to avoid reception ambiguity and to allow for adequate processing time for the UE receiver. Examples of explicit broadcast signaling includes physical control format indication channel (PCFICH) received in an earlier subframe or a broadcast type DCI.

According to certain aspects, the UE may perform blind detection (i.e., with no signaling) to determine the transmission direction of flexible subframes. For example, the UE may blindly detect the presence of downlink signals/channels in a resource block (RB). The UE may detect, for example, whether CRS is present—especially, whether CRS is present in the first symbol or in the first two symbols of the subframe. CRS for the first and second eNB antennas may be received in the first symbol of the subframe while CRS for the third and fourth eNB antennas may be received in the second symbol of the subframe.

As another example, the UE may detect whether PCFICH is present in the current subframe. As another example, the UE may detect whether DM-RS is present in any RBs. In aspects, the UE may receive an indication of whether or not virtual cell identification (VCID) is used for DM-RS and, if VCID is used, the UE may also receive an indication of a corresponding set of possible VCIDs. As another example, the UE may detect whether EPDCCH is present in any RBs. In aspects, the UE may assume or be indicated the set of resources for EPDCCH and corresponding parameters (e.g., the VCID for EPDCCH). This may enable to UE to limit the number of blind decodes the UE performs.

According to certain aspects, the UE may blindly detect the presence of uplink signals/channels in a RB. For example, the UE may detecting the presence of sounding reference signal (SRS), physical uplink control channel (PUCCH), and/or PUSCH.

In aspects, the UE may perform blind detection of the presence of any signal already defined, or a combination of signals already defined, as long as the uplink and downlink structures do not share common signals or signal formats, as is the case for LTE. It may be desirable, however, for the signal on which blind detection is performed to be identifiable as belonging to a particular cell, because the determination of whether a flexible subframe is for uplink or downlink direction should be made on a cell-specific basis. It may also be possible that a new signal or set of new signals are defined specifically for the purposes of aiding the reliable determination of flexible subframe direction by a receiver. As another example, the format of an existing signal may be modified to aid a more reliable determination of flexible subframe direction. The receiver may use a combination of existing signals, modified signals, or new signals upon which to perform blind detection.

According to certain aspects, upon determining that the flexible subframe is an UL subframe, the UE may skip the subframe for interference and/or channel measurement. There may be no CSI-RS or IMR for measurement and/or it may not be desirable to measure. In aspects, if the UE performs CSI measurement filtering, the UE may further omit the flexible subframe from the filtering operation.

Alternatively, upon determining that the flexible subframe is an UL subframe, the UE may perform interference and/or channel measurements using a fraction of system bandwidth or using full system bandwidth if CSI-RS or IMR is still available and uplink interference can be avoided or is desirable to measure (e.g., if indicated by the eNB). In aspects, CSI-RS or IMR may puncture uplink transmissions. In aspects, if the UE performs CSI measurement filtering, the measurement may be included in the filtering operation. Separate filtering may be performed if the flexible subframe is a downlink subframe or if the flexible subframe is an uplink subframe.

According to certain aspects, CSI reporting may be periodic or aperiodic. If the UE determines a subframe to be an uplink flexible subframe, the UE may omit CSI reporting for that flexible subframe. This approach may result in some saving in uplink overhead. Alternatively, if the UE determines a flexible subframe to be for uplink, the UE may still report CSI for the flexible subframe, but may report a predetermined value (e.g., out-of-range (OOR) or 0). For uplink power control, a special power control may be performed for these reports. For example, the UE may use reduced power control or no power control for these bits. For determining the amount of resources for piggybacking the CSI feedback on PUSCH, for example, the UE may not allocate resource for this report or may allocate reduced resource. In another alternative, if the UE determines a flexible subframe to be for uplink communications, the UE may report CSI as usual. The report may be based on measurement from valid downlink subframe(s) before the flexible subframe. As a result, the reported CSI value may be outdated. This approach may be useful for eNB and UE alignment.

In aspects, the eNB can determine whether a report is based on a downlink or uplink subframe. As a result, the eNB may discard reports by the UE that are measured based on uplink subframes.

It may be desirable to avoid the scenario of a potential lack of CRS (or lack of full CRS) transmission in a flexible subframe and a UE configured to perform CRS based CSI measurement and reporting for the flexible subframe. According to certain aspects, the UE may specify a "new" CSI-RS and IMR configured in the last symbol of a subframe such that, when a flexible subframe is an uplink subframe, the last symbol in the subframe may be used for downlink channel measurement. Uplink transmissions (e.g., PUCCH and/or PUSCH) in the subframe may use shortened formats. For example, the uplink transmissions may not use the last symbol of the subframe (so the last symbol can be used for the downlink channel measurement). Additionally, SRS can be omitted from this subframe.

According to certain aspects, the UE may perform subframe type dependent measurement. In aspects, the UE may declare all flexible subframes as invalid subframes for downlink measurements. As such, the UE may perform measurements in fixed subframes only. Alternatively, the RS for CSI measurement by the UE may be subframe dependent. For example, the UE may use CRS for measurement in fixed subframes and CSI-RS for measurement in flexible subframes. In another alternative, the UE may perform measurement only based on certain CRS in a subframe. For example, the UE perform measurement based only on the CRS in the first symbol of a flexible subframe if the flexible subframe is configured as or operated as an MBSFN subframe—where CRS is only present in the first symbol of the subframe.

Figure 8:
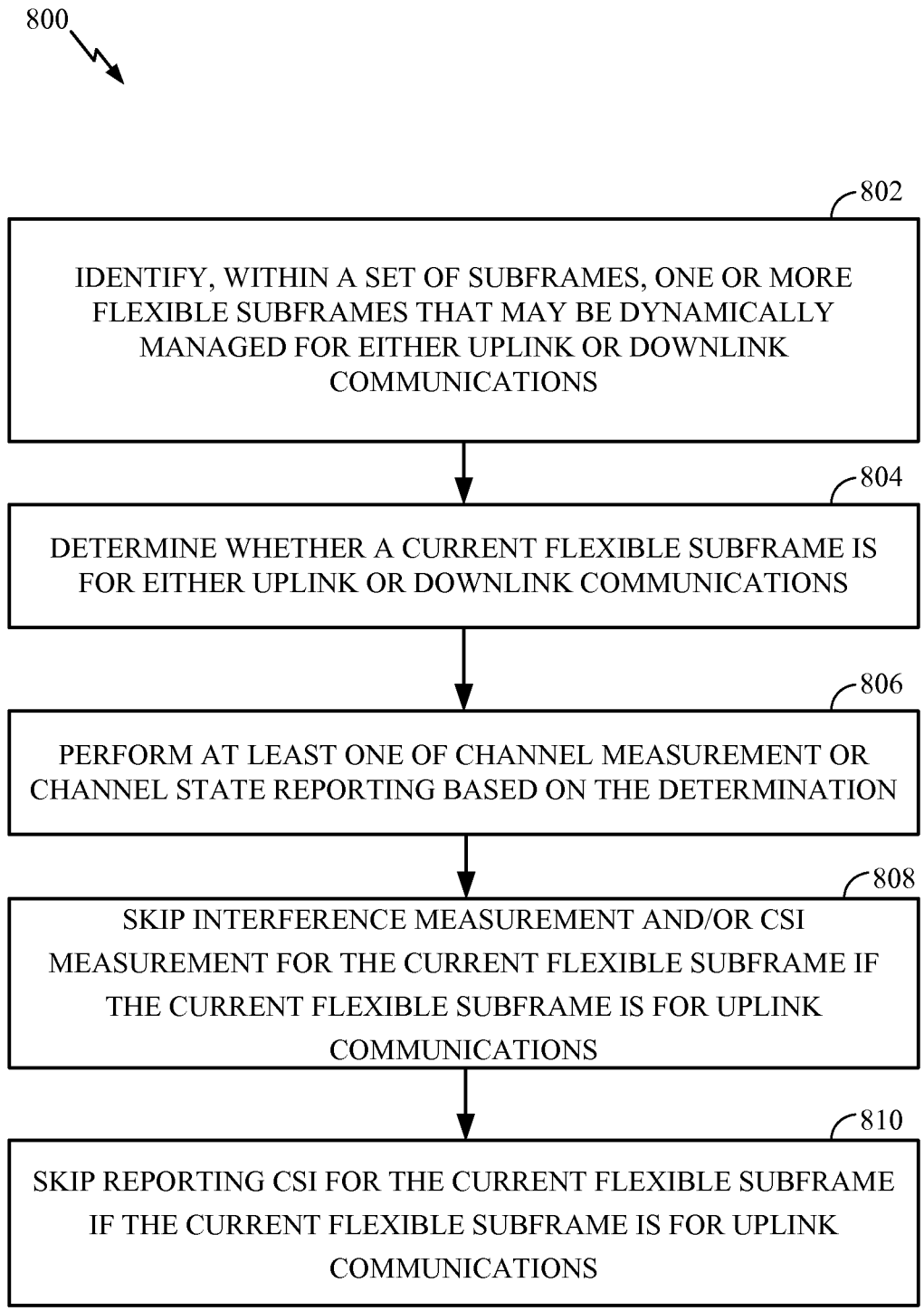
FIG. 8 illustrates example operations for wireless communications that may be performed by a UE, in accordance with certain aspects of the present disclosure.

FIG. 8 illustrates example operations 800 for wireless communications, in accordance with certain aspects of the present disclosure. The operations 800 may be performed, for example, by a user equipment (UE) (e.g., UE 120). Operations 800 may begin, at 802, by identifying, within a set of subframes, one or more flexible subframes that may be dynamically managed for either uplink or downlink communications. In aspects, the UE may also identify one or more fixed subframes that are dedicated for either uplink communications or downlink communications.

At 804, the UE may determine whether a current flexible subframe is for either uplink or downlink communications. In aspects, the UE may make the determination based on receiving broadcast signaling or dedicated signaling explicitly indicating the subframes as for uplink or downlink. In aspects, the UE may perform blind detection in order to determine the presence of uplink or downlink signals.

At 806, the UE may perform at least one of channel measurement, interference measurement, or channel state reporting based on the determination. In aspects, if the flexible subframe is determined to be for uplink, the UE may skip interference measurement and/or channel state information (CSI) measurement filtering for that subframe. Alternatively, the UE may perform interference measurement using fraction of or full system bandwidth. In aspects, the UE may omit CSI reporting for the flexible subframe or report a predetermined value. Alternatively, the UE may specify a new CSI-RS and IMR in the last symbol of the flexible subframe which may be used for downlink channel measurements. In aspects, the UE may designate all flexible subframes as invalid subframes for downlink measurements.

At 808, the UE may skip interference measurement and/or CSI measurement for that subframe if the flexible subframe is for uplink.

At 810, the UE may skip reporting CSI for the current flexible subframe if the current flexible subframe is for UL communication.

Figure 9:
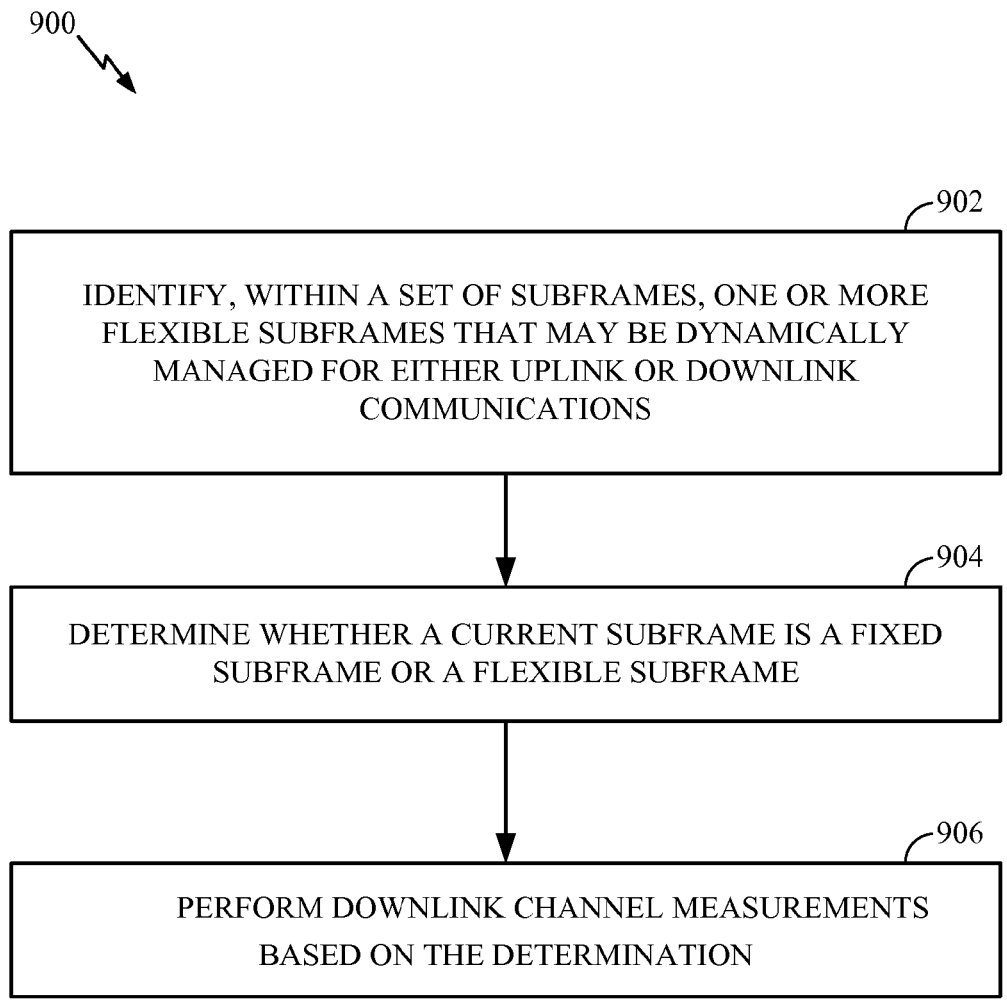
FIG. 9 illustrates example operations for wireless communications that may be performed by a UE, in accordance with certain aspects of the present disclosure.

FIG. 9 illustrates example operations 900 for wireless communications, in accordance with certain aspects of the present disclosure. The operations 900 may be performed, for example, by a user equipment (UE) (e.g., UE 120). Operations 900 may begin, at 902, by identifying, within a set of subframes, one or more flexible subframes that may be dynamically managed for either uplink or downlink communications.

At 904, the UE may determine whether a current subframe is a fixed subframe or a flexible subframe.

At 906, the UE may perform downlink channel measurements based on the determination. In aspects, the UE may designate flexible subframes as invalid for downlink channel measurements and perform downlink channel measurements on fixed subframes. Alternatively, the UE may perform downlink measurements using CRS in fixed subframes and perform downlink measurements using CSI-RS in flexible subframes. In aspects, if flexible subframes are used as MBSFN subframes downlink measurements may be performed using only CRS in the first one or two symbols of the subframe.

Figure 10:
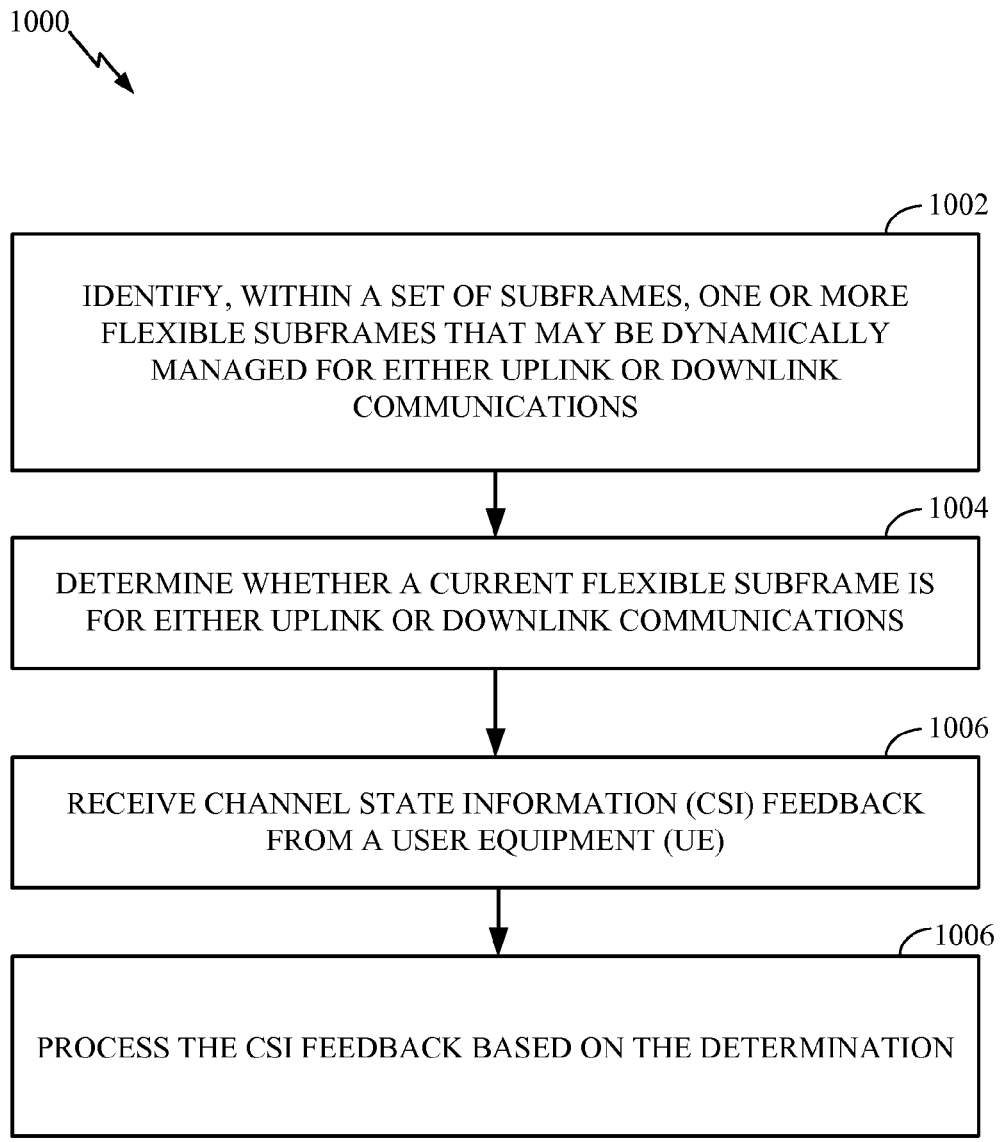
FIG. 10 illustrates example operations for wireless communications that may be performed by a base station, in accordance with certain aspects of the present disclosure.

FIG. 10 illustrates example operations 1000 for wireless communications, in accordance with certain aspects of the present disclosure. The operations 1000 may be performed, for example, by a base station (e.g., BS 110). Operations 1000 may begin, at 1002, by identifying, within a set of subframes, one or more flexible subframes that may be dynamically managed for either uplink or downlink communications.

At 1004, the BS may determine whether a current flexible subframe is for either uplink or downlink communications. In aspects, the BS may signal send broadcast signaling or dedicated signaling to the UE explicitly indicating the subframes as for uplink or downlink. In aspects, the BS may convey the broadcast or dedicated signaling in a subframe different from the current flexible subframe.

At 1006, the BS may receive CSI feedback from a UE.

At 1008, the BS may process the CSI feedback based on the determination. For example, the BS may only process CSI feedback for the current flexible subframe if the current flexible subframe is for downlink communications. In aspects, the BS may assume a predetermined value for the CSI feedback if the current flexible subframe is for uplink communications. In aspects, the BS may assume a value based on a measurement performed in one or more subframe(s) before the current flexible subframe if the current flexible subframe is for uplink communications.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    identifying, within a set of subframes, one or more flexible subframes that are dynamically managed for either uplink or downlink communications;
    determining whether a current flexible subframe is for uplink communications; and
    performing at least one of channel measurement, interference measurement, or channel state reporting for the current flexible subframe based on the determination that the current flexible subframe is for uplink communications, wherein the performing channel measurement, interference measurement, or channel state reporting for the current flexible subframe based on the determination comprises:
        performing downlink channel measurement based on at least one of a channel state information reference signal (CSI-RS) or an interference measurement resource (IMR) in a last symbol of the current flexible subframe.

2. The method of claim 1, wherein the determining comprises:
    receiving an explicit indication that the current flexible subframe is for uplink communications.

3. The method of claim 2, wherein the explicit indication is received via at least one of broadcast signaling or dedicated signaling.

4. The method of claim 3, wherein the at least one of broadcast signaling or dedicated signaling is received in a subframe different from the current flexible subframe.

5. The method of claim 1, wherein the determining comprises:
    performing blind detection of one or more uplink signals in the current flexible subframe.

6. The method of claim 5, wherein the one or more uplink signals comprise at least one of: a sounding reference signal (SRS), a physical uplink control channel (PUCCH), or a physical uplink shared channel (PUSCH).

7. The method of claim 1, wherein the performing channel measurement, interference measurement, or channel state reporting for the current flexible subframe based on the determination comprises:
    skipping the current flexible subframe for at least one of: channel measurement or interference measurement.

8. The method of claim 1, wherein the performing channel measurement, interference measurement, or channel state reporting for the current flexible subframe based on the determination comprises:
    performing channel measurement or interference measurement using a fraction of system bandwidth or using full system bandwidth.

9. The method of claim 1, wherein the performing channel measurement, interference measurement, or channel state reporting for the current flexible subframe based on the determination comprises:
    skipping reporting CSI for the current flexible subframe.

10. The method of claim 1, wherein the performing channel measurement, interference measurement, or channel state reporting for the current flexible subframe based on the determination comprises:
    reporting a predetermined value for CSI for the current flexible subframe.

11. The method of claim 1, wherein the performing channel measurement, interference measurement, or channel state reporting for the current flexible subframe based on the determination comprises:
    reporting a value for CSI for the current flexible subframe based on a measurement performed in one or more subframes before the current flexible subframe.

12. The method of claim 1, wherein the performing channel measurement, interference measurement, or channel state reporting for the current flexible subframe based on the determination comprises:
    performing downlink channel measurement or interference measurement based on at least one of: a cell-specific reference signal (CRS), a CSI-RS, or an IMR.

13. The method of claim 1, wherein at least one of a physical uplink control channel (PUCCH) or a physical uplink shared channel (PUSCH) does not use the last symbol of the current flexible subframe.

14. The method of claim 13, wherein the CSI-RS or the IMR in the current flexible subframe shares a resource with an uplink reference signal in a fixed uplink subframe.

15. A method for wireless communications by a base station, comprising:

identifying, within a set of subframes, one or more flexible subframes that are dynamically managed for either uplink or downlink communications;

determining whether a current flexible subframe is for uplink communications;

transmitting at least one of: a channel state information reference signal (CSI-RS) or an interference measurement resource (IMR) to a user equipment (UE) in a last symbol of the current flexible subframe, receiving channel state information (CSI) feedback for the current flexible subframe from the UE based on the at least one CSI-RS or IMR; and processing the CSI feedback based on the determination that the current flexible subframe is for uplink communications.

16. The method of claim 15, further comprising sending an explicit indication, to the UE, of the determination.

17. The method of claim 16, wherein the explicit indication is sent via at least one of broadcast signaling or dedicated signaling.

18. The method of claim 17, wherein the at least one of broadcast signaling or dedicated signaling is sent in a subframe different from the current flexible subframe.

19. An apparatus for wireless communications by a user equipment (UE), comprising:

at least one processor configured to:
identify, within a set of subframes, one or more flexible subframes that are dynamically managed for either uplink or downlink communications;
determine whether a current flexible subframe is for uplink communications; and
perform at least one of channel measurement, interference measurement, or channel state reporting for the current flexible subframe based on the determination that the current flexible subframe is for uplink communications, wherein the at least one processor performs channel measurement, interference measurement, or channel state reporting for the current flexible subframe by:
performing downlink channel measurement based on at least one of a channel state information reference signal (CSI-RS) or an interference measurement resource (IMR) in a last symbol of the current flexible subframe; and a memory coupled with the at least one processor.

20. The apparatus of claim 19, comprising:
an interface configured to receive an explicit indication that the current flexible subframe is for uplink communications, wherein the determination is based on the explicit indication.

21. The apparatus of claim 19, wherein:
the at least one processor is further configured to perform blind detection of one or more uplink signals in the current flexible subframe; and
the determination is based on the blind detection.

22. The apparatus of claim 19, wherein the at least one processor performs channel measurement, interference measurement, or channel state reporting for the current flexible subframe based on the determination by:
skipping the current flexible subframe for at least one of: channel measurement or interference measurement.

23. An apparatus for wireless communications by a base station, comprising:

at least one processor configured to:
identify, within a set of subframes, one or more flexible subframes that are dynamically managed for either uplink or downlink communications;
determine whether a current flexible subframe is for uplink communications;
transmit at least one of: a channel state information reference signal (CSI-RS) or an interference measurement resource (IMR) to a user equipment (UE) in a last symbol of the current flexible subframe;
receive channel state information (CSI) feedback for the current flexible subframe from the UE based on the at least one CSI-RS or IMR; and
process the CSI feedback based on the determination that the current flexible subframe is for uplink communications; and a memory coupled with the at least one processor.

24. The apparatus of claim 23, further comprising an interface configured to send an explicit indication, to the UE, of the determination.

* * * * *